(12) United States Patent
Kim et al.

(10) Patent No.: US 12,260,275 B2
(45) Date of Patent: Mar. 25, 2025

(54) PORTABLE NFC DEVICE THAT RELEASES RESET IN RESPONSE TO RADIO FREQUENCY SIGNAL, AND NFC TAG CIRCUIT INCLUDED THEREIN

(71) Applicant: 3A Logics Inc., Gyeonggi-do (KR)

(72) Inventors: Sung Wan Kim, Gyeonggi-do (KR); Pyeong Han Lee, Gyeonggi-do (KR); Kwang Beom Park, Gyeonggi-do (KR); Sung Hun Chun, Gyeonggi-do (KR); Chang Ho Ryu, Gyeonggi-do (KR)

(73) Assignee: 3A Logics Inc., Gyeonggi-do (KR)

( * ) Notice: Subject to any disclaimer, the term of this patent is extended or adjusted under 35 U.S.C. 154(b) by 35 days.

(21) Appl. No.: 18/139,647

(22) Filed: Apr. 26, 2023

(65) Prior Publication Data

US 2024/0256816 A1    Aug. 1, 2024

(30) Foreign Application Priority Data

Jan. 31, 2023    (KR) .......................... 10-2023-0012349

(51) Int. Cl.
    *G06K 19/07*    (2006.01)
(52) U.S. Cl.
    CPC ..... *G06K 19/0702* (2013.01); *G06K 19/0723* (2013.01)
(58) Field of Classification Search
    CPC .................. G06K 19/0702; G06K 19/0723
    USPC ....................................................... 235/492
    See application file for complete search history.

(56) References Cited

U.S. PATENT DOCUMENTS

| 10,680,677 | B2 | 6/2020 | Wobak et al. |
| 2009/0086517 | A1* | 4/2009 | Wei .................. H02M 3/156 363/50 |
| 2015/0305595 | A1 | 10/2015 | Khait et al. |

OTHER PUBLICATIONS

Extended Search Report dated Oct. 19, 2023, corresponding to European application No. 23170065.9, 8 pages.

* cited by examiner

*Primary Examiner* — Toan C Ly
(74) *Attorney, Agent, or Firm* — J. Clinton Wimbish; Maynard Nexsen PC

(57) ABSTRACT

Disclosed is an NFC device without a power button. The NFC device includes a battery that outputs a battery voltage, an internal system that includes a voltage receiving terminal for receiving the battery voltage and a reset signal receiving terminal for receiving a reset signal, and maintains a reset state in response to the reset signal having a first state, and an NFC tag circuit that generates the reset signal having the first state, and generates the reset signal having a second state in response to only a system power on command included in a system power on NFC signal transmitted from an external near field communication (NFC) device, in which the internal system releases the reset state in response to the reset signal having the second state, and then, generates a reset release holding signal using the battery voltage, and transmits the generated reset release holding signal to the NFC tag circuit, and the NFC tag circuit generates the reset signal maintaining the second state according to the reset release holding signal.

11 Claims, 5 Drawing Sheets

PORTABLE NFC DEVICE THAT RELEASES RESET IN RESPONSE TO RADIO FREQUENCY SIGNAL, AND NFC TAG CIRCUIT INCLUDED THEREIN

RELATED APPLICATION DATA

The present application claims priority pursuant to 35 U.S.C. § 119 (a) to Korean Patent Application Number 10-2023-0012349 filed Jan. 31, 2023, which is incorporated herein by reference in its entirety.

BACKGROUND

1. Field

The present invention relates to a near field communication (NFC) device, and more particularly, to a portable NFC device without a power button that releases a reset in response to a radio frequency (RF) signal transmitted from an external NFC device, and an NFC tag circuit included therein.

2. Description of Related Art

Radio-frequency identification (RFID) is classified into a low frequency (LF) RFID, a high frequency (HF) RFID, and an ultra high frequency (UHF) RFID depending on frequencies of radio waves used for communication.

The low frequency ranges from 30 kHz to 300 kHz, and an LF RFID system typically operates at 125 kHz or 134.2 kHz.

The high frequency ranges from 3 MHz to 30 MHZ, and the HF RFID system operates at 13.56 MHz. The HF RFID system using 13.56 MHz refers to near field communication (NFC).

The ultra high frequency ranges from 300 MHz to 3 GHZ, and the HF RFID system operates at 860 MHz to 960 MHz.

A passive RFID tag refers to a tag that does not include a battery, and the passive RFID tag uses a radio frequency signal transmitted from an RFID reader to generate an operating voltage required for the passive RFID tag.

RELATED ART DOCUMENT

Patent Document (Patent Document 1) Korean Patent Laid-Open Publication No. 10-2014-0091362 (published on Jul. 21, 2014)
(Patent Document 2) Korean Patent Publication No. 10-0834841 (Published on Jun. 3, 2008)
(Patent Document 3) U.S. Pat. No. 11,026,609 (Published Jun. 8, 2021)

SUMMARY

The technical problem to be achieved by the present invention provides a portable NFC device that releases a reset of an internal system, which can use a battery voltage of a battery included in the portable NFC device without a power button as an operating voltage, using a passive NFC tag circuit operating in response to a radio frequency signal, and then, enables the internal system to operate using the battery voltage in a state in which the reset of the internal system is released even if no NFC signal is received from the external NFC device, and an NFC tag circuit included therein.

In an aspect of the present invention, an near field communication (NFC) device includes: a battery that outputs a battery voltage; an internal system that includes a voltage receiving terminal for receiving the battery voltage and a reset signal receiving terminal for receiving a reset signal, and maintains a reset state in response to the reset signal having a first state; and an NFC tag circuit that generates the reset signal having the first state, and generates the reset signal having a second state in response to only a system power on command included in a system power on NFC signal transmitted from an external near field communication (NFC) device, in which the internal system releases the reset state in response to the reset signal having the second state, and then, generates a reset release holding signal using the battery voltage, and transmits the generated reset release holding signal to the NFC tag circuit, and the NFC tag circuit generates the reset signal maintaining the second state according to the reset release holding signal.

In another aspect of the present invention, an NFC tag circuit releasing a reset of an internal system maintaining the reset in response to a reset signal having a first state despite receiving a battery voltage of a battery, the NFC tag circuit includes: a rectifier that receives a system power on NFC signal from the external NFC device through an antenna and rectifies the received system power on NFC signal; a regulator that receives an output voltage of the rectifier and outputs a DC voltage; a demodulator that demodulates the system power on NFC signal received through the antenna to generate the demodulated system power on signal; a microcontroller unit that uses only the DC voltage as an operating voltage and generates an internal system power on signal according to a system power on command included in the demodulated system power on signal output from the demodulator; and an internal system reset release control circuit that generates the reset signal having a second state to release the reset of the internal system according to the internal system power on signal.

BRIEF DESCRIPTION OF DRAWINGS

In order to more fully understand the drawings cited in the detailed description of the present invention, a detailed description of each drawing is provided.

DETAILED DESCRIPTION

Figure 1:
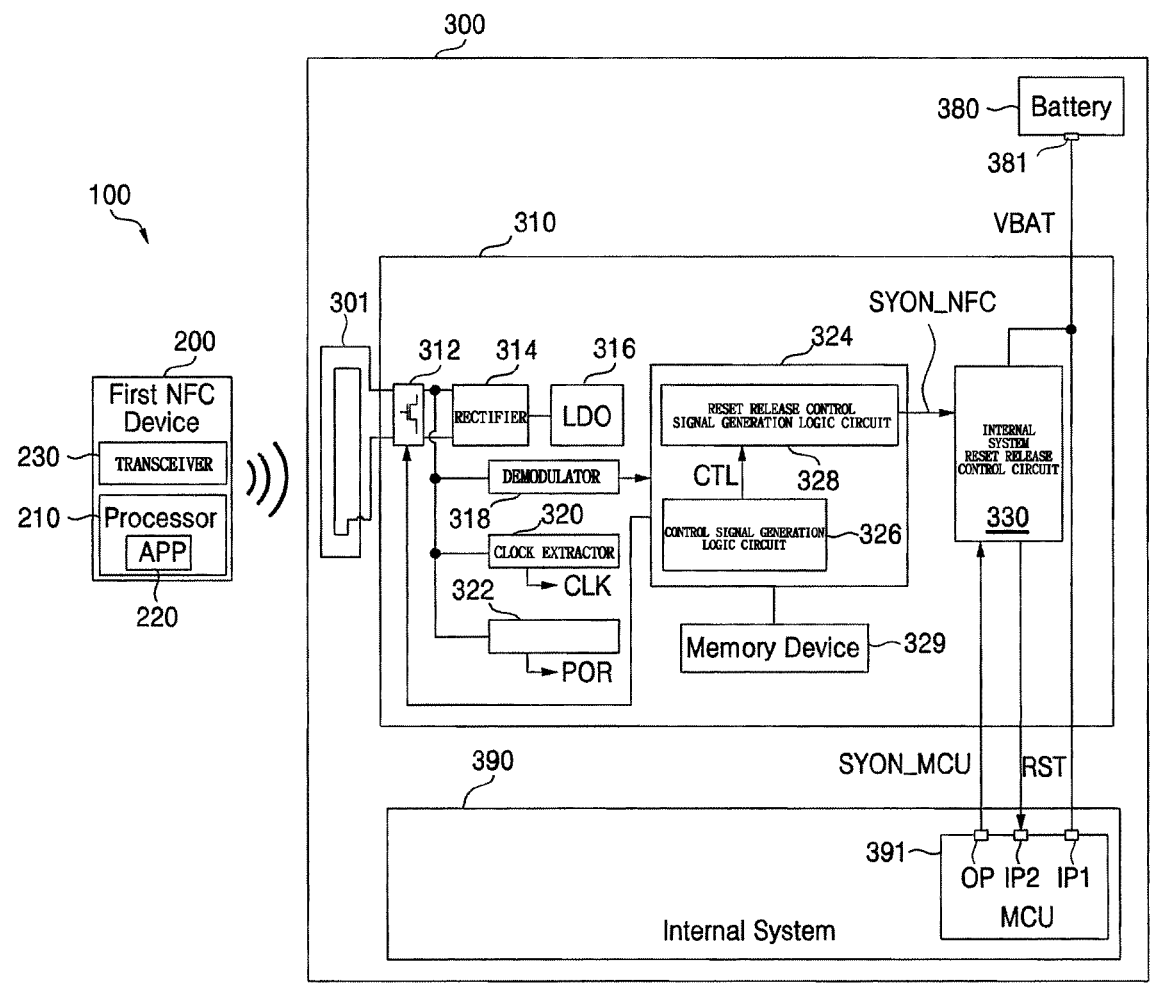
FIG. 1 is a block diagram of an NFC system including an NFC device capable of releasing a reset of an internal system included in the NFC device using a passive NFC tag circuit operating in response to a radio frequency signal transmitted from an external NFC device, according to an embodiment of the present invention.

FIG. 1 is a block diagram of a near field communication (NFC) system including an NFC device capable of releasing a reset of an internal system included in the NFC device using a passive NFC tag circuit operating in response to a radio frequency signal transmitted from an external NFC device, according to an embodiment of the present invention.

Referring to FIG. 1, an NFC system 100 includes a first NFC device 200 and a second NFC device 300. The first NFC device 200 may be a smart phone, an NFC reader, or an electronic device including the NFC reader. The second NFC device 300 may be a healthcare device or a portable NFC device. Also, the second NFC device 300 may be an electronic device including a passive NFC tag circuit 310. The passive NFC tag circuit 310 may be an IC or an IC chip.

For example, when a battery 380 included in the second NFC device 300 runs out, the second NFC device 300 may be a disposable portable NFC device 300 that may not be recycled.

The first NFC device 200 may use a radio frequency (RF) signal (e.g., a near-field communication (NFC) signal having a 13.56 MHz band) to release a reset of an internal system 390 included in the second NFC device 300 or power-on the internal system 390.

The fact that the second NFC device 300 is powered-on ('wake up' or 'reset release') by the first NFC device 200 refers to that the internal system 390 included in the second NFC device 300 normally operates using a battery voltage VBAT of the battery 380 as an operating voltage.

The first NFC device 200 includes a processor 210 executing an application 220 (APP) and a transceiver (or modem) 230 capable of transmitting and receiving RF signals to and from the second NFC device 300. The application 220 is an application program, that is, an abbreviation for an application program. The application program is a program designed to directly perform a specific function to a user or, in some cases, to other applications. An operation of the application 220 will be described in detail with reference to FIG. 3.

The second NFC device 300 includes an antenna 301, a passive NFC tag circuit 310, the battery 380, and the internal system 390. Components 301, 310, 380, and 390 are protected by a housing of the second NFC device 300.

From the point of view of the second NFC device 300, the second NFC device 300 includes the battery 380 for operating only the internal system 390.

However, from the point of view of the passive NFC tag circuit 310, the passive NFC tag circuit 310 does not transmit and receive an NFC signal to and from the first NFC device 200 using the battery voltage VBAT of the battery 380, and generates the operating voltage required for the passive NFC tag circuit 310 using only the RF signal transmitted from the first NFC device 200.

The internal system 390 may be a continuous glucose monitoring system (CGMS), a biosensor system including a biosensor for analysis by a combination of a biological element and a physicochemical sensor, or a system for releasing a reset only by the control of the NFC tag circuit 310.

The housing refers to a part (i.e., protective frame) or a case that covers sensitive components 301, 310, 380, and/or 390 with a frame to protect the sensitive components 301, 310, 380, and/or 390, with the sensitive components 301, 310, 380, and/or 390 being highly likely to cause problems when the second NFC device 300 contacts the outside in any form. The second NFC device 300 may be waterproof to an IP68 level by a waterproof material included in the housing.

According to an embodiment of the present invention, any type of device (e.g., power button or power switch) capable of controlling the supply of the output voltage VBAT of the battery 380 to the internal system 390 is not installed on an outside (or outer surface) of the second NFC device 300 completely covered by the housing.

Therefore, unless the second NFC device 300 receives a system power on NFC signal (referred to as 'MCU 391 reset release NFC signal') including a system power on command (referred to as the 'MCU 391 reset release command') from the first NFC device 200, the user of the second NFC device 300 may not operate the internal system 390 using the output voltage VBAT of the battery 380.

The second NFC device 300 may transmit and receive an RF signal (e.g., an NFC signal or a radio-frequency identification (RFID) signal) to and from the transceiver 230 of the first NFC device 200 through the antenna 301. For example, the antenna 301 may be a coil antenna or a loop antenna.

The passive NFC tag circuit 310 receives the system power on command included in the system power on NFC signal transmitted from the first NFC device 200 through the antenna 301, and releases a reset of the MCU 391 of the internal system 390, which may use the voltage VBAT as the operating voltage, in response to only to the received system power on command. The MCU 319 is also called a microcontroller or a control device.

That is, the passive NFC tag circuit 310 releases the reset of the MCU 391 of the internal system 390 according to the system power on command included in the system power on NFC signal transmitted from the first NFC device 200, and does not operate using the battery voltage VBAT of the battery 380.

The passive NFC tag circuit 310 includes a modulator 312, a rectifier 314, a regulator 316, a demodulator 318, a clock extractor 320, a power on reset circuit 322, an NFC MCU 324, a memory device 329, and an internal system reset release control circuit 330.

In FIG. 1, the internal system reset release control circuit 330 is illustrated in a form included (or integrated) in the passive NFC tag circuit 310, but, according to embodiments, the internal system reset release control circuit 330 may be disposed outside the passive NFC tag circuit 310.

When the first NFC device 200 is brought close to (or tagged with) the second NFC device 300, the antenna 301 receives an NFC signal of 13.56 MHz emitted by the transceiver 230 of the first NFC device 200. According to embodiments, a limiter (not illustrated) may be used between the antenna 301 and the modulator 312 to prevent the output voltage of the antenna 301 from becoming too large.

The output voltage of the antenna 301 is supplied to the rectifier 314 to extract the operating voltage of the passive NFC tag circuit 310. The regulator 316 uses (or regulates) the voltage rectified by the rectifier 314 to generate a DC voltage (or constant voltage). The regulator 316 may be a linear regulator or a low drop-output (LDO) regulator.

When the output voltage of the antenna 301 becomes sufficiently high, a power on reset signal (POR) is generated by the power on reset circuit 322. The power on reset signal (POR) is composed of components (e.g., 312, 318, 320, 322, and 330) of an analog-front end and components (e.g., 324 and 329) of a digital circuit.

The clock extractor 320 extracts a clock (or clock signal; CLK) for the components 324 and/or 329 of the digital circuit from the output voltage of the antenna 301. Accordingly, the passive NFC tag circuit 310 operates synchronously with the NFC signal transmitted from the first NFC device 200.

To receive the NFC signal (or data) from the first NFC device 200, the demodulator 318 is used. For example, the demodulator 318 demodulates the NFC signal (or data) from the first NFC device 200 using an envelope detector and transmits the demodulated signal (e.g., the demodulated digital signal) into the NFC MCU 324.

The modulator 312 is used to transmit data transmitted from the NFC MCU 324 to the first NFC device 200. According to an embodiment, the modulator 312 modulates the data transmitted from the NFC MCU 324 using load modulation and transmits the modulated NFC signal to the first NFC device 200 through the antenna 301.

The NFC MCU 324 interprets (or decodes) the digital signal demodulated by the demodulator 318, and generates the internal system power on signal (also referred to as a 'reset release control signal.' SYON_NFC) according to the interpretation (or decoding) result and transmits the generated internal system power on signal SYON_NFC to the internal system reset release control circuit 330.

According to embodiments, the NFC MCU 324 includes a control signal generation logic circuit 326 and a reset release control signal generation logic circuit 328. These circuits 326 and 328 are circuits related to the release of the reset of the internal system 390.

Figure 2:
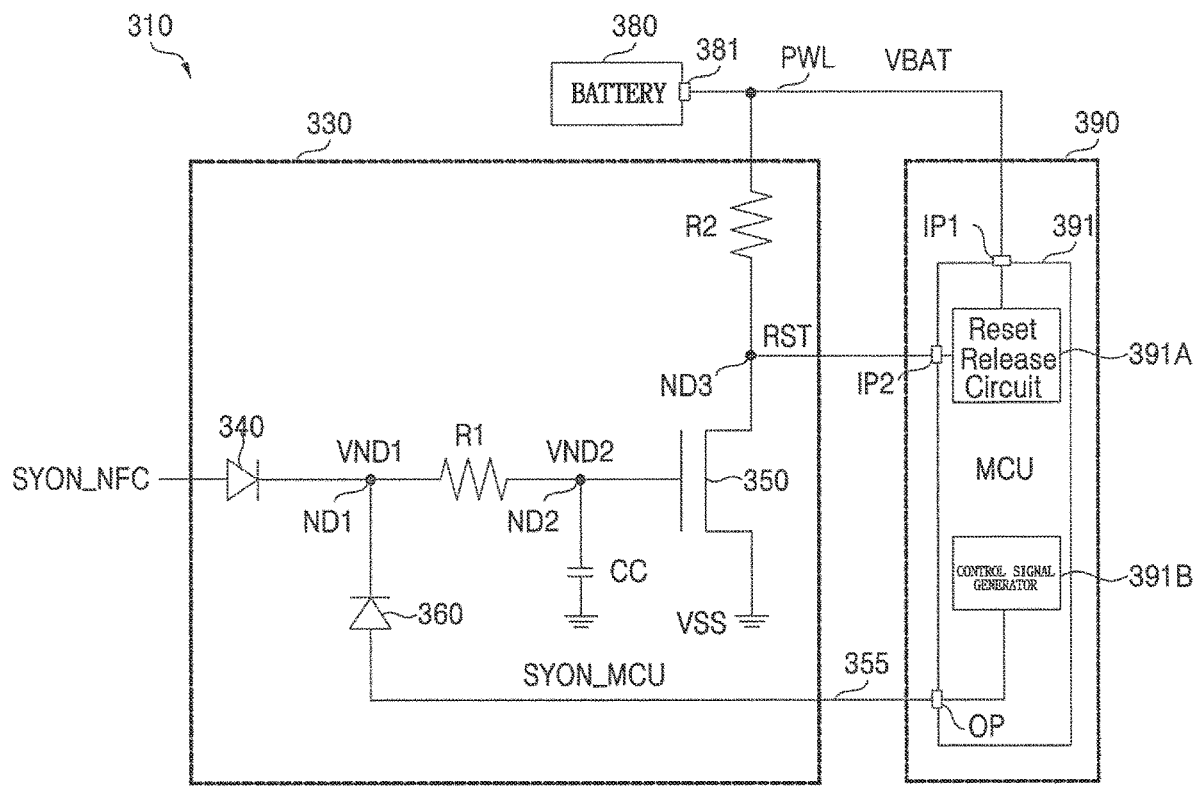
FIG. 2 is a circuit diagram of an internal system reset release control circuit illustrated in FIG. 1.

FIG. 2 is a circuit diagram of an internal system reset release control circuit illustrated in FIG. 1.

FIG. 2 illustrates the battery 380 and the internal system 390 together with the internal system reset release control circuit 330 for convenience of explanation.

Referring to FIGS. 1 and 2, the NFC MCU 324 decodes the system power on command included in the system power on NFC signal demodulated by the demodulator 318, and generates a control signal CTL corresponding to the decoding result and transmits the control signal CTL to the reset release control signal generation logic circuit 328.

For example, the control signal generation logic circuit 326 performing the function of the decoder decodes the demodulated system power-on command and generates a control signal CTL having a first state.

The reset release control signal generation logic circuit 328 generates the internal system power on signal SYON_NFC having the first state according to the control signal CTL having the first state and transmits the internal system power on signal SYON_NFC to the internal system reset release control circuit 330. Here, it is assumed that the first state means a first level or a high level H, and the second state means a second level or low level L.

The memory device 329 stores a unique identifier (UID) capable of uniquely identifying the second NFC device 300, and may be implemented as a non-volatile memory device such as electrically erasable programmable read-only memory (EEPROM).

The internal system reset release control circuit 330 includes a first diode 340 (also referred to as a first transfer circuit), a first resistor R1, a capacitor CC, a pull-down circuit 350, a second resistor R2, and a second diode 360 (also referred to as a second transmission circuit).

The first diode 340 receives the internal system power on signal SYON_NFC and outputs a current in a forward direction.

The first resistor R1 is connected between the output terminal (e.g., a cathode terminal, ND1) of the first diode 340 and the second terminal ND2.

The capacitor CC is connected between a second terminal ND2 and a ground VSS.

The pull-down circuit 350 pulls down a voltage RST of a third terminal ND3 to the ground VSS in response to a voltage VND2 of the second terminal ND2 input to the control terminal. For example, when the pull-down circuit 350 is an NMOS transistor, the control terminal is a gate electrode of the NMOS transistor 350.

The second resistor R2 is connected between a voltage transmission line PWL connected to the output terminal 381 outputting the battery voltage VBAT and a third node ND3. When the internal system 390 is in a reset state, the second resistor R2 serves as a pull-up resistor that pulls a voltage of a reset signal receiving terminal IP2 connected to the reset signal output terminal ND3 to the battery voltage VBAT, that is, the first state.

An anode of the second diode 360 is connected to an output terminal OP of the internal system 390 and a cathode of the second diode 360 is connected to the first terminal ND1. Each terminal ND1, ND2, and ND3 may also be called a node.

The output terminal 381 of the battery 380 is connected to the voltage receiving terminal IP1 of the internal system 390 through the voltage transmission line PWL, and the third terminal ND3 is connected to the reset signal receiving terminal IP2 of the internal system 390.

That is, the battery voltage VBAT of the battery 380 is supplied to the MCU 391 through the voltage receiving terminal (IP1), but the reset signal RST having the first state (e.g., high level) is supplied to the reset signal receiving terminal IP2. Therefore, since the MCU 391 of the internal system 390 maintains the first state according to the reset signal RST, the MCU 391 does not operate.

Figure 3:
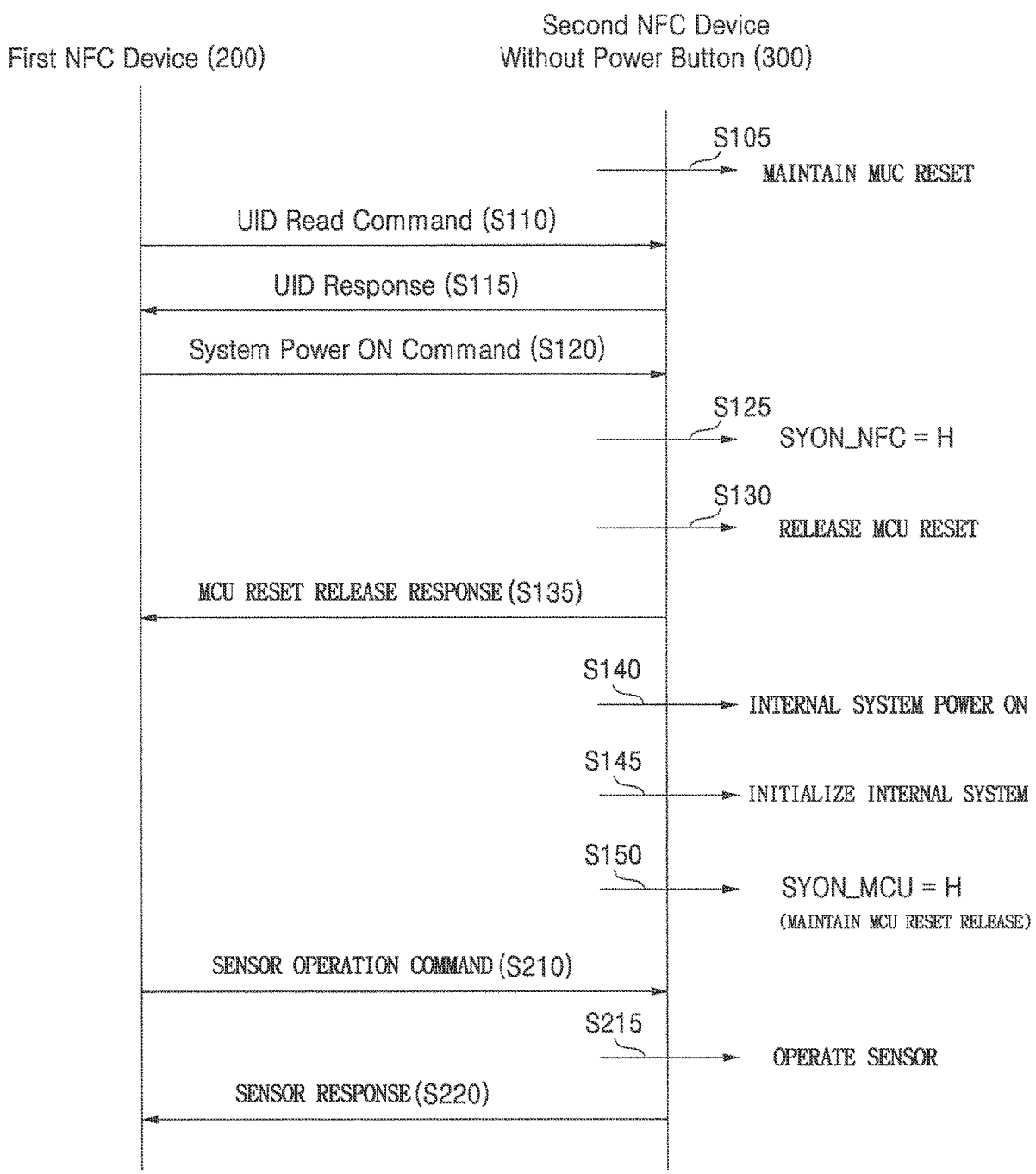
FIG. 3 is a data flow illustrating a method of operating an NFC system illustrated in FIG. 1.
Figure 4:
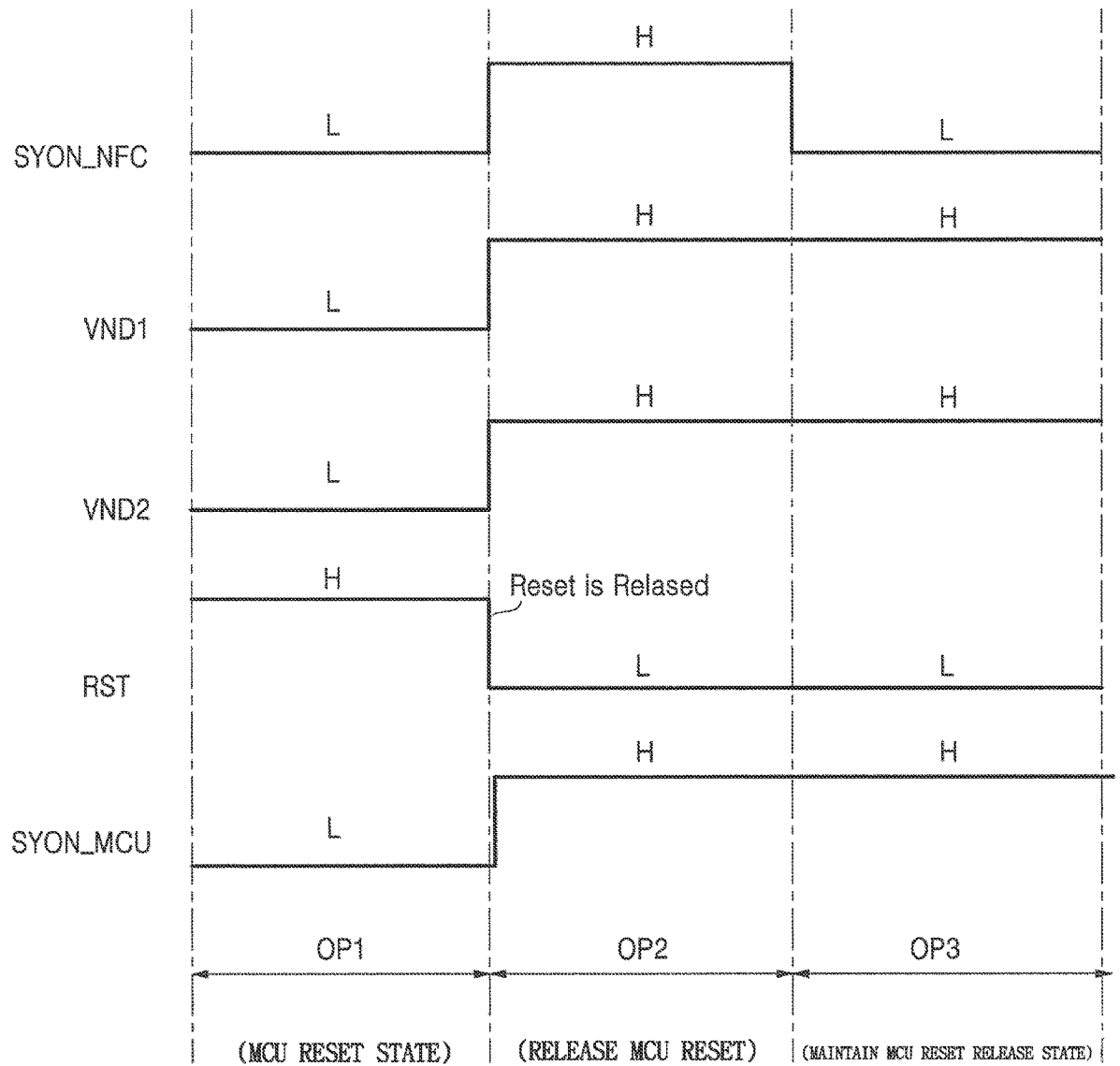
FIG. 4 is a timing diagram of voltages for describing an operation of a passive NFC tag circuit illustrated in FIG. 2.

FIG. 3 is a data flow for describing a method of operating an NFC system illustrated in FIG. 1, and FIG. 4 is a timing diagram of voltages for describing an operation of a passive NFC tag circuit illustrated in FIG. 2.

In FIG. 4, for convenience of explanation, each signal SYON_NFC, VND1, VND2, RST, and SYON_MCU is expressed in digital signal form, but each signal SYON_NFC, VND1, VND2, RST, and SYON_MCU may have an analog signal form.

The operation of the second NFC device 300 in a first operating mode OP1 will be described with reference to FIGS. 1 to 4. In the first operating mode OP1, the MCU 391 of the internal system 390 maintains a reset state.

Initially, even if the MCU 391 of the internal system 390 receives the battery voltage VBAT, the MCU 391 maintains a reset state, so the MCU 391 does not operate (S105).

In the first operating mode OP1, the first NFC device 200 does not transmit any RF signal (e.g., NFC signal) to the second NFC device 300. That is, since the passive NFC tag circuit 310 of the second NFC device 300 does not receive RF power (also referred to as 'energy') by the RF signal from the first NFC device 200, the passive NFC tag circuit 310 does not operate, and since the MCU 391 of the internal system 390 maintains the reset state according to the reset signal RST having the first state, the MCU 391 also does not operate.

In the first operating mode OP1, since the passive NFC tag circuit 310 of the second NFC device 300 does not receive the RF power by the RF signal from the first NFC device 200, the output voltage of the rectifier 314 and the regulator 316, respectively, is 0 (zero) V. Accordingly, the NFC MCU 324 generates the internal system power on signal SYON_NFC having the second state (e.g., low level).

Referring to FIGS. 2 and 4, the internal system power on signal SYON_NFC is a low level L. Since the MCU 391 is in the reset state, the reset release holding signal (SYON_MCU) is a low level L.

Therefore, since each of the voltage VND1 of the first terminal ND1 and the voltage VND2 of the second terminal ND2 is a low level L, the pull-down circuit 350 is disabled (that is, the NMOS transistor 350 is turned off).

Since the battery voltage VBAT is supplied to the third terminal ND3 through the second resistor R2, a voltage level H of the reset signal RST is equal to the level of the battery voltage VBAT. Accordingly, the MCU 391 maintains the reset state as it is.

The operation of the second NFC device 300 in a second operating mode OP2 will be described with reference to FIGS. 1 to 4.

In the second operating mode OP2, even if the MCU 391 of the internal system 390 receives the battery voltage VBAT, the MCU 391 maintains the reset state, so the MCU 391 does not operate (S105).

The application 220 of the first NFC device 200 transmits a UID read NFC signal including a UID read command to the second NFC device 300 through the transceiver 230 (S110).

Since the second NFC device 300 receives the RF power by the RF signal from the first NFC device 200, that is, receives the UID read NFC signal, the rectifier 314 rectifies the UID lead NFC signal received through the antenna 301 to generate the rectified voltage, and the regulator 316 regulates the rectified voltage to supply the regulated voltage, i.e., a DC voltage or a constant voltage, to at least one of components 312, 318, 320, 322, 324, and 329.

The demodulator 318 receives and demodulates the UID read NFC signal through the antenna 301 and transmits the demodulated UID read signal to the NFC MCU 324.

The NFC MCU 324 decodes the demodulated UID read command included in the demodulated UID read signal, reads the UID of the second NFC device 300 from the memory device 329 according to the decoding result, and transmits the UID response including the read UID to the modulator 312.

The modulator 312 modulates the UID response including the UID and transmits the modulated UID response NFC signal to the transceiver 230 of the first NFC device 200 through the antenna 301 (S115).

For example, since the control signal generation logic circuit 326 outputs the control signal CTL having the second state to the reset release control signal generation logic circuit 328 according to the UID read command included in the demodulated UID read signal, the reset release control signal generation logic circuit 328 generates the internal system power signal SYON_NFC having the second state and outputs the generated internal system power signal SYON-NFC to the internal system reset release control circuit 330. The MCU 391 of the internal system 390 maintains the reset state by the internal system reset release control circuit 330.

After receiving the UID response NFC signal through the transceiver 230, the application 220 of the first NFC device 200 generates the system power on NFC signal including the system power on command, and transmits the generated system power on NFC signal to the antenna 301 of the second NFC device 300 through the transceiver 230 (S120). According to embodiments, steps S110 and S115 may not be performed before step S120 is performed.

Since the second NFC device 300 receives the RF power by the RF signal from the first NFC device 200, that is, receives the system power on NFC signal, the rectifier 314 rectifies the system power on NFC signal received through the antenna 301 to generate the rectified voltage, and the regulator 316 regulates the rectified voltage to supply the regulated voltage to at least one of components 312, 318, 320, 322, 324, and 329.

The demodulator 318 receives and demodulates the system power on NFC signal through the antenna 301 and transmits the demodulated system power on signal to the NFC MCU 324.

The NFC MCU 324 decodes the demodulated system power-on command included in the demodulated system power on signal, and outputs the internal system power signal SYON_NFC having the first state H to the internal system reset release control circuit 330 according to the decoding result (S125). The MCU 391 of the internal system 390 is released from the reset state by the internal system reset release control circuit 330.

For example, since the control signal generation logic circuit 326 outputs the control signal CTL having the first state to the reset release control signal generation logic circuit 328 according to the demodulated system power on command included in the demodulated system power on signal, the reset release control signal generation logic circuit 328 generates the internal system power signal SYON_NFC having the first state H and outputs the generated internal system power signal SYON-NFC to the internal system reset release control circuit 330 (S125).

Referring to FIGS. 2 and 4, as the internal system power on signal SYON_NFC is in the first state H, the voltage VND1 of the first terminal ND1 and the voltage VND2 of the second terminal ND2, respectively, are in the first state H, and the pull-down circuit 350 is enabled (i.e., the NMOS transistor 350 is turned on).

As the pull-down circuit 350 is enabled (that is, the NMOS transistor 350 is turned on), the voltage RST of the third terminal ND3 is pulled down to the ground VSS, for example, the second state L. As the voltage RST of the third terminal ND3 is pulled down to the ground VSS, the reset of the MCU 391 is released (S130).

For example, the reset release circuit 391A of the MCU 391 releases the reset of the MUC 391 in response to the reset signal RST transitioning (changing) from the first state H to the second state L.

As the reset of the MCU 391 is released (S130), the MCU 391 starts operating using the battery voltage VBAT. That is, as the internal system 390 is powered on (S140), the internal system 390 is initialized or booted (S145).

As the MCU 391 starts to operate using the battery voltage VBAT, the control signal generator 391B finally generates the reset release holding signal SYON_MCU having the first state H and outputs the generated reset release holdings signal SYON-MCU to the second diode 360 through the output terminal OP (S150).

For example, when the GPIO bus 355 is connected between the output terminal OP and the second diode 360, the reset release holding signal SYON_MCU is transmitted to the second diode 360 through the GPIO pin OP and the GPIO bus 355.

After the reset of the MCU 391 is released, the internal system power on signal SYON_NFC transitions from the first state (e.g., high level H) to the second state (e.g., low level L), the voltage VND1 of the first terminal ND1 maintains the first state H according to a reverse current blocking function of the second diode 360, and charges output from the second diode 360 are sufficiently charged to maintain the first state H in a capacitor CC through the first resistor R1.

While the MCU 391 outputs the reset release holding signal SYON_MCU having the first state H, the voltage VND2 of the second terminal ND2 maintains the first state H and the NMOS transistor 350 maintains the turn-on state, so the MCU 391 maintains the reset release state in response to the reset signal RST maintaining the second state L as it is (S150).

Accordingly, the MCU 391 maintaining the reset release state continues to operate using the battery voltage VBAT.

According to the embodiment, after the reset of the MCU 391 of the internal system 390 is released (S130), the NFC MCU 324 generates the MCU reset release response and transmits the generated MCU reset release response to the modulator 312.

The modulator 312 modulates the MCU reset release response, generates an MCU reset release response NFC signal including the modulated MCU reset release response, and transmits the generated MCU reset release response NFC signal to the transceiver 230 of the first NFC device 200 through the antenna 301 (S135).

After the reset of the MCU 391 of the internal system 390 is released and the MCU 391 starts operating, except for the case where the battery voltage VBAT becomes low enough that the MCU 391 does not operate, the user of the second NFC device 300 may not reset the MCU 391 of the internal system 390 again.

The operation of the second NFC device 300 in a third operating mode OP3 will be described with reference to FIGS. 1 to 4.

The third operating mode OP3 is an operating mode after the reset of the MCU 391 of the internal system 390 is released according to the system power on command included in the system power on NFC signal.

Even if the second NFC device 300 does not receive any RF signal (e.g., NFC signal) from the first NFC device 200, the MCU 391 of the internal system 390 maintains the reset release state as it is according to the reset signal RST of the second state L output from the internal system reset release control circuit 330.

In the third operating mode OP3, since the passive NFC tag circuit 310 of the second NFC device 300 does not receive the RF power by the RF signal from the first NFC device 200, the output voltage of the rectifier 314 and the regulator 316, respectively, is 0 (zero) V. Accordingly, the NFC MCU 324 generates the internal system power on signal SYON_NFC having the second state L.

Referring to FIGS. 2 and 4, even if the internal system power on signal SYON_NFC is in the second state L, the reset released MCU 391 outputs the reset release holding signal SYON_MCU having the first state H generated using the battery voltage VBAT to the second diode 360.

According to the output voltage of the second diode 360, the voltage VND1 of the first terminal ND1 maintains the first state H, and the charges output from the second diode 360 are sufficiently charged to maintain the first state H in the capacitor CC through the first resistor R1. In this case, since each of the diodes 340 and 360 block the reverse flow of the current corresponding to the voltage VND1 of the first terminal ND1, the voltage VND1 of the first terminal ND1 maintains the first state H.

While the MCU 391 outputs the reset release holding signal SYON_MCU having the first state H, the voltages VND1 and VND2 of each of the terminals ND1 and ND2 maintains the first state H and the NMOS transistor 350 maintains the turn-on state, so the MCU 391 maintains the reset release state in response to the reset signal RST maintaining the second state L (S150).

Accordingly, the MCU 391 maintaining the reset release state continues to operate using the battery voltage VBAT.

Figure 5:
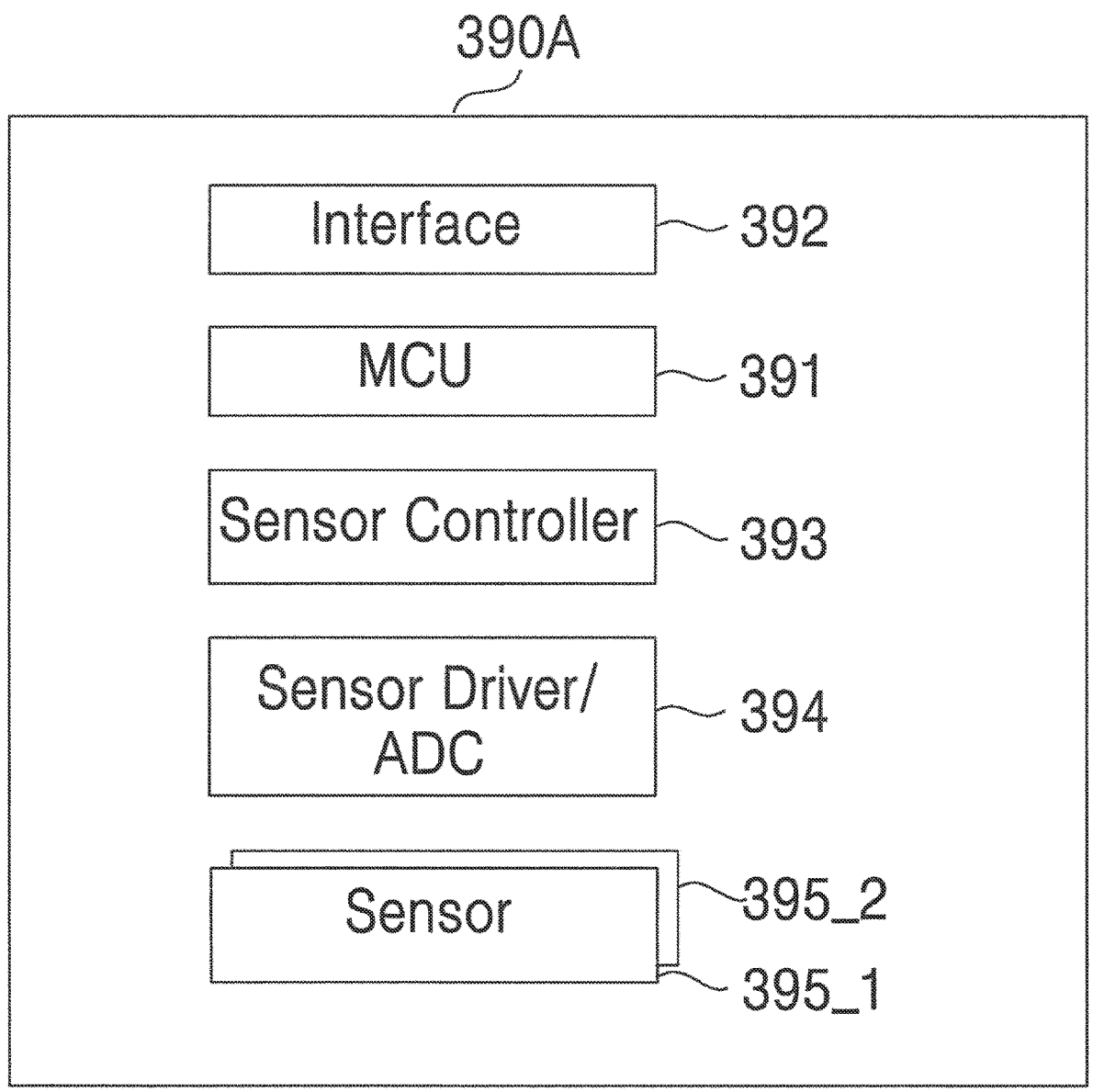
FIG. 5 is an embodiment of a block diagram of the internal system illustrated in FIG. 1.

FIG. 5 is an embodiment of a block diagram of the internal system illustrated in FIG. 1.

An internal system 390A of FIG. 5 is an embodiment of internal system 390 illustrated in FIG. 1. The internal system 390A includes an MCU (or processor, 391), an interface 392, a sensor controller 393, a signal processing circuit 394 including a sensor driver and an analog-to-digital converter (ADC)), and at least one sensor 395_1 and 395_2.

Referring to FIGS. 3 and 5, after the reset of the MCU 391 is released according to the second operating mode OP2, the application 220 of the first NFC device 200 transmits a sensor operation NFC signal including a sensor operation command to the second NFC device 300 through the transceiver 230 (S210).

Since the second NFC device 300 receives the RF power by the sensor operation NFC signal from the first NFC device 200, the rectifier 314 rectifies the sensor operation NFC signal received through the antenna 301 to generate the rectified voltage, and the regulator 316 regulates the rectified voltage to supply the regulated voltage to at least one of components 312, 318, 320, 322, 324, and 329.

The demodulator 318 receives and demodulates the sensor operation NFC signal through the antenna 301 and transmits the demodulated sensor operation NFC signal to the NFC MCU 324.

The NFC MCU 324 decodes the demodulated sensor operation command included in the demodulated sensor operation signal and generates a first sensor control signal for controlling the operation of at least one of the sensors 395_1 and 395_2 according to the decoding result and transmits the generated first sensor control signal to the interface 392 of the internal system 390A.

Since the state in which the reset of the MCU 391 is released is maintained, the MCU 391 is operating using the battery voltage VBAT.

The MCU 391 receives and interprets the first sensor control signal through the interface 392, and generates a second sensor control signal corresponding to the interpretation result, and transmits the generated second sensor control signal to the sensor controller 393.

The sensor controller 393 receives and interprets the second sensor control signal, and transmits the sensor driving signal to the sensor driver included in the signal processing circuit 394. The sensor driver drives at least one of the sensors 395_1 and 395_2 using the sensor driving signal.

For example, the first sensor 395_1 may be a glucose sensor, a sensor for continuous glucose monitoring (GCM), a biosensor, or the like, and the second sensor 395_2 may be a temperature sensor, but is not limited thereto.

The ADC of the signal processing circuit 394 receives an analog detection signal from at least one of the sensors 395_1 and 395_2, converts the analog detection signal into a first digital detection signal, and transmits the first digital detection signal to the sensor controller 393.

The sensor controller 393 generates a second digital signal corresponding to the first digital detection signal and transmits the generated second digital signal to the MCU 391. The MCU 391 generates a sensor response corresponding to the second digital signal and transmits the generated sensor response to the NFC MCU 324 through the interface 392.

The MCU 324 transmits the sensor response to the modulator 312, and the modulator 312 modulates the sensor response and transmits the generated sensor response NFC signal to the transceiver 230 of the first NFC device 200 through the antenna 301 (S220). The application 220 of the first NFC device 200 processes the sensor response NFC signal received through the transceiver 230.

A portable NFC device without a power button according to an embodiment of the present invention may use an NFC tag circuit that operates in response to a radio frequency signal transmitted from an external NFC device to release a reset of an internal system which may use a battery voltage of a battery included in the portable NFC device as an operating voltage, and then, enable the internal system to operate using the battery voltage in a state in which the reset of the internal system is released even if no NFC signal is received from the external NFC device.

Although the present invention has been described with reference to exemplary embodiments shown in the accompanying drawings, it is only an example. It will be understood by those skilled in the art that various modifications and other equivalent exemplary embodiments are possible from the present invention. Accordingly, an actual technical protection scope of the present invention is to be defined by the following claims.

What is claimed is:

1. An NFC device, comprising:
a battery that outputs a battery voltage;
an internal system that includes a voltage receiving terminal for receiving the battery voltage and a reset signal receiving terminal for receiving a reset signal, and maintains a reset state in response to the reset signal having a first state; and
an NFC tag circuit that generates the reset signal having the first state, and generates the reset signal having a second state in response to only a system power on command included in a system power on NFC signal transmitted from an external near field communication (NFC) device,
wherein the internal system releases the reset state in response to the reset signal having the second state, and then, generates a reset release holding signal using the battery voltage, and transmits the generated reset release holding signal to the NFC tag circuit, and
the NFC tag circuit generates the reset signal maintaining the second state according to the reset release holding signal,
wherein the NFC tag circuit includes:
a rectifier that receives the system power on NFC signal from the external NFC device through an antenna and rectifies the received system power on NFC signal;
a regulator that receives an output voltage of the rectifier and outputs a DC voltage;
a demodulator that demodulates the system power on NFC signal received through the antenna to generate the demodulated system power on signal;
a microcontroller unit that uses only the DC voltage as an operating voltage and generates an internal system power on signal according to a demodulated system power on command included in the demodulated system power on signal output from the demodulator; and
an internal system reset release control circuit that generates the reset signal having the second state according to the internal system power on signal,
wherein the internal system reset release control circuit includes:
a second resistor that is connected between a reset signal output terminal connected to the reset signal receiving terminal and an output terminal of the battery; and
a pull-down circuit that is connected between the reset signal output terminal and a ground and connects the reset signal output terminal to the ground according to the internal system power on signal transmitted to the control terminal to generate the reset signal maintaining the second state.

2. The NFC device of claim 1, wherein the internal system reset release control circuit further includes a second transmission circuit that transmits the reset release holding signal to the control terminal, and
the pull-down circuit maintains the connection between the reset signal output terminal and the ground according to the reset release holding signal input to the control terminal.

3. The NFC device of claim 2, wherein the internal system reset release control circuit further includes:
a first transmission circuit that transmits the internal system power on signal to an output terminal of the second transmission circuit;
a first resistor that is connected between the output terminal of the second transmission circuit and the control terminal; and
a capacitor that is connected between the control terminal and the ground.

4. The NFC device of claim 3, wherein each of the first transmission circuit and the second transmission circuit is a diode.

5. The NFC device of claim 1, wherein the internal system maintains the reset state in response to the reset signal having the first state even if the battery voltage is supplied through the voltage receiving terminal, and finally releases the reset state in response to the reset signal having the second state and is then initialized using the battery voltage, and
includes a microcontroller unit that generates the reset release holding signal using the battery voltage after the initialization is completed and transmits the generated reset release holding signal to the NFC tag circuit.

6. The NFC device of claim 5, wherein the internal system further includes:
a sensor;
a sensor driver that drives the sensor according to a sensor driving signal; and
a sensor controller that generates the sensor driving signal under control of the microcontroller unit.

7. The NFC device of claim 6, wherein the sensor is a biosensor.

8. The NFC device of claim 6, further comprising a GPIO bus that transmits the reset release holding signal output from the microcontroller unit to the NFC tag circuit.

9. An NFC tag circuit releasing a reset of an internal system maintaining the reset in response to a reset signal having a first state despite receiving a battery voltage of a battery, the NFC tag circuit comprising:
a rectifier that receives a system power on NFC signal from the external NFC device through an antenna and rectifies the received system power on NFC signal;
a regulator that receives an output voltage of the rectifier and outputs a DC voltage;
a demodulator that demodulates the system power on NFC signal received through the antenna to generate the demodulated system power on signal;
a microcontroller unit that uses only the DC voltage as an operating voltage and generates an internal system power on signal according to a system power on command included in the demodulated system power on signal output from the demodulator; and an internal system reset release control circuit that generates the reset signal having a second state to release the reset of the internal system according to the internal system power on signal, wherein the internal system reset release control circuit maintains the reset signal having the second state as it is in response to a reset release holding signal generated by the internal system from which the reset is released in response to the reset signal having the second state, and the reset release holding signal is generated using the battery voltage, wherein the internal system reset release control circuit further includes:
- a second resistor that is connected between an output terminal of the battery and a reset signal output terminal outputting the reset signal to the internal system; and
- a pull-down circuit that is connected between the reset signal output terminal and a ground and connects the reset signal output terminal to the ground according to the internal system power on signal input to the control terminal to generate the reset signal maintaining the second state.

10. The NFC tag circuit of claim 9, wherein the internal system reset release control circuit further includes a second diode that transmits the reset release holding signal to the control terminal, and the pull-down circuit maintains the connection between the reset signal output terminal and the ground according to the reset release holding signal input through the second diode and the control terminal.

11. The NFC tag circuit of claim 10, wherein the internal system reset release control circuit further includes:
- a first diode that transmits the internal system power on signal to an output terminal of the second diode;
- a first resistor that is connected between the output terminal of the second diode and the control terminal; and
- a capacitor that is connected between the control terminal and the ground.

* * * * *